(12) United States Patent
Mam

(10) Patent No.: US 9,195,670 B1
(45) Date of Patent: Nov. 24, 2015

(54) TRACKING WRITE OPERATIONS FOR INCREMENTAL BACKUPS OF DATA

(71) Applicant: EMC Corporation, Hopkinton, MA (US)

(72) Inventor: Neelabh Mam, Jodhpur (IN)

(73) Assignee: EMC Corporation, Hopkinton, MA (US)

( * ) Notice: Subject to any disclaimer, the term of this patent is extended or adjusted under 35 U.S.C. 154(b) by 232 days.

(21) Appl. No.: 13/799,725

(22) Filed: Mar. 13, 2013

(51) Int. Cl.
*G06F 17/00* (2006.01)
*G06F 17/30* (2006.01)

(52) U.S. Cl.
CPC .............................. *G06F 17/30088* (2013.01)

(58) Field of Classification Search
CPC ....................... G06F 11/1451; G06F 17/30067
See application file for complete search history.

(56) References Cited

U.S. PATENT DOCUMENTS

| | | | | |
|---|---|---|---|---|
| 7,743,028 B1* | 6/2010 | Stringham et al. | ............ | 707/646 |
| 8,117,410 B2* | 2/2012 | Lu et al. | ............ | 711/162 |
| 8,615,489 B2* | 12/2013 | Pershin et al. | ............ | 707/625 |
| 2011/0088027 A1* | 4/2011 | Jelvis et al. | ............ | 717/174 |

* cited by examiner

*Primary Examiner* — Rehana Perveen
*Assistant Examiner* — Loc Tran
(74) *Attorney, Agent, or Firm* — Novak Druce Connolly Bove + Quigg LLP

(57) ABSTRACT

Approaches are described for tracking write operations in an operating system environment which can be used to perform incremental backups of data. In particular, the approaches described herein enable a driver to begin tracking write operations being performed on a volume device (or snapshot of a volume) without having to reboot the system and without causing interruption to operations being performed on the volume. The tracking is enabled by applying a patch to a driver provided by the operating system to replace an original write handler of the driver with an alternate write handler. This alternate handler is used to track the sequence of write operations performed on a snapshot of the volume device. An active bitmap is maintained for recording changed blocks resulting from the write operations. Tins active bitmap can subsequently be used to perform an incremental backup of the volume device based on the snapshot.

9 Claims, 8 Drawing Sheets

TRACKING WRITE OPERATIONS FOR INCREMENTAL BACKUPS OF DATA

FIELD OF THE INVENTION

The various embodiments described herein relate generally to backing up and/or copying data on computing devices, and in particular to tracking writes and other operations within an operating system environment in order to perform incremental backups.

BACKGROUND

Conventionally, computing devices include at least one operating system (OS) that manages hardware and provides various services for applications running on the computing device to allow these applications to access the hardware. Some applications are designed to perform backups by periodically copying data from a source drive or volume to a specified destination. These backup applications typically need to interact with the operating system of the device in order to perform the backups. Such interactions with the OS often require the backup application to register one or more drivers with the operating system.

In some cases, the installation of the drivers requires a reboot of the system before they are able to perform their intended function correctly. However, the processes involved in rebooting the system usually require a significant downtime of the device, which can be undesirable, especially for production servers that may be hosting mission critical applications and workloads.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments described in this disclosure enable the tracking of write operations and other input/output (I/O) operations in an operating system environment, which can be used to perform incremental backups of data. In particular, the approaches described herein enable a driver to begin tracking write operations being performed on a volume device for snapshot of a volume) without having to reboot the machine and without causing interruption to the various operations being performed on the volume.

In various embodiments, the method includes accessing a driver of an operating system on a computer, such as a driver that is responsible for creating snapshots of a volume device. A patch is applied to the driver to replace an original write handler of the driver with an alternate write handler. Similarly, the patch replaces an original control handler with an alternate control handler. These alternate handlers are used to track the sequence of write operations performed on the snapshot of the volume device. The method also maintains an active bitmap that records the changed blocks resulting from the write operations. This active bitmap can subsequently be used to perform an incremental backup (copy) of the volume device based on the snapshot.

Figure 1:
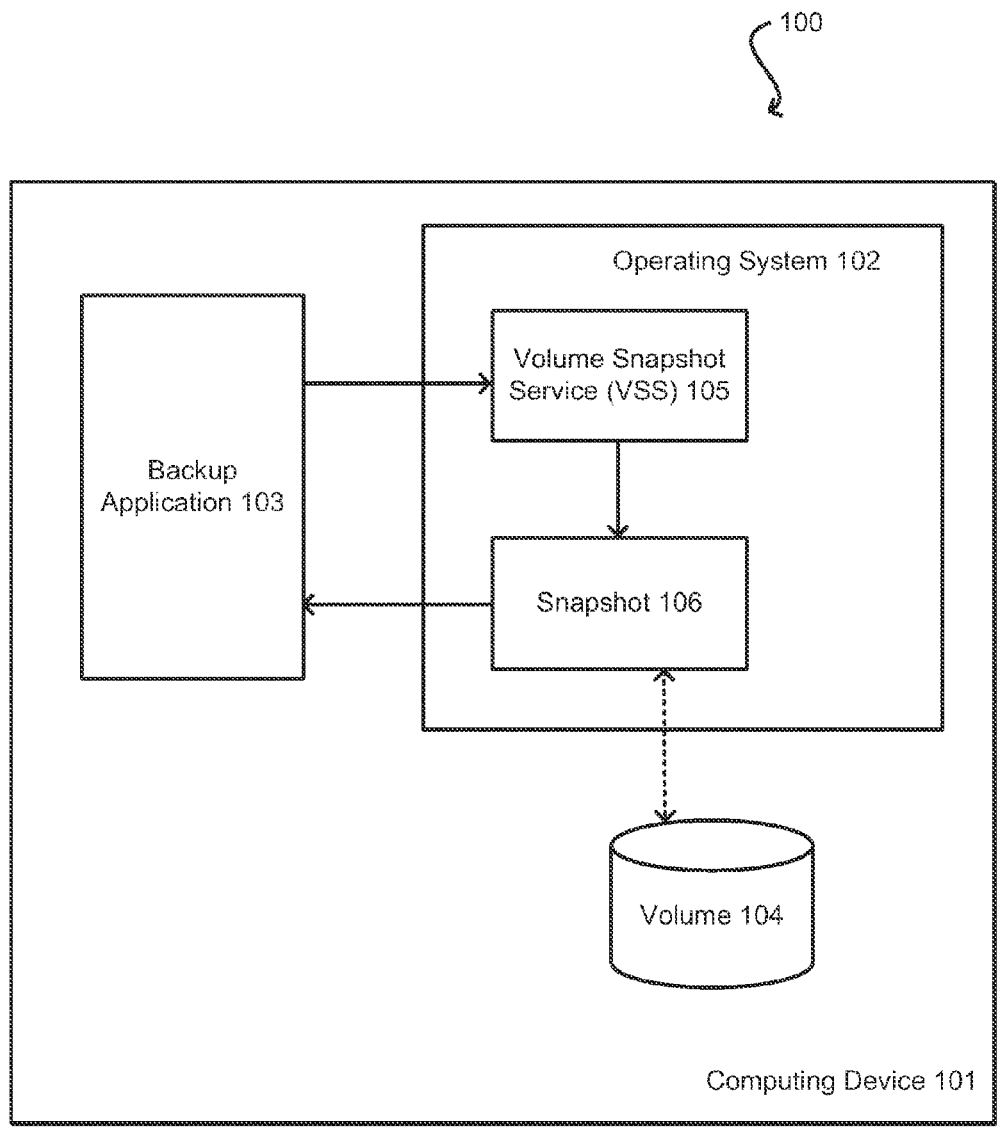
FIG. 1 illustrates an example of a backup application that uses the volume snapshot service (VSS) to create a snapshot that may be used for incremental backups, in accordance with various embodiments.

FIG. 1 illustrates an example 100 of a backup application that uses the volume snapshot service (VSS) to create a snapshot that may be used for incremental backups, in accordance with various embodiments. As shown in the illustration, a computing device 101 may include an operating system 102 and a backup application 103 that performs incremental backups of various data sets on the computing device.

In certain operating systems, such as Microsoft Windows™ based operating systems, many types of resources are represented as devices. These devices may be physical devices or logical devices. For example, a hard disk is an example of a physical device and this physical device may have several logical devices on it created by the system. A logical device created by the operating system on top of the physical device is often referred to as a volume 104. A volume 104 may thus represent a partition of the physical disk drive.

When a backup application 103 (e.g., host-based incremental backup application) wishes to perform a backup of a particular volume 104, the backup application 103 first sends a request to a volume snapshot service (VSS) 105 provided by the operating system 102, requesting the VSS 105 to produce a snapshot 106 of the volume 104. This snapshot 106 represents the state of the volume 104 at a particular point in time (e.g., the point in time at which the request was submitted). In response to receiving the request, the VSS 105 causes the snapshot 106 to be created and provides the snapshot to the backup application 103, which can in turn use the snapshot 106 to perform a block-level backup operation.

In various embodiments, the backup application 103 may need to perform incremental backups, such as by periodically synchronizing any changes that were made to the volume 104 since the last backup operation. In order to enable such incremental backups, the backup application 103 continuously tracks write operations (and/or other I/O operations) and maintains a changed block bitmap that records all of the write operations performed on the volume 104 since the last backup. This bitmap may then be used to perform the subsequent backup.

In some embodiments, such write tracking may be accomplished by registering an upper filter driver to the volume class device. For example, the Windows™ operating system includes a framework which exposes a functional driver for each particular device (e.g., volume 104). The functional driver is usually responsible for performing all of the input/output (I/O) operations that are received to the device, among performing various other functions. Each device that the OS 102 exposes may have a corresponding function driver. The operating system also gives the application developers (e.g., driver writers) the ability to extend those function drivers with their own custom logic. For example, if a developer wants to intercept an I/O operation directed to a volume device 104, the developer can write a filter driver for that function driver and register that filter driver with the OS.

Once registered, the filter driver (e.g., write tracking driver) can monitor write operations and maintain a bitmap of blocks that have changed since a particular point in time. However, this approach of registering the filter driver would normally require the system to be rebooted for the filter driver to successfully attach to the volume device stacks that were already built prior to registering the filter. For example, after registering the driver on a running machine, if the system was not rebooted, the OS would attach the filter driver only against those volumes that come up after it was registered successfully. This means that, if there were three volumes "C:" volume, "D:" volume and "E:" volume) on the system before registering the filter, then there would be no instance of the filter driver on these three volumes. However any new volume that is brought up after the filter is registered, would get an instance of the filter driver. This happens because all registered upper/lower filter drivers are added to the stack at the time when the stack is built, which usually happens at boot time.

One option in the above example would be to attach an instance of the filter driver on some of the volumes (e.g., "D:" volume and "E:" volume) after registering the filter and while the system is up and running by bringing the underlying disk for these volumes offline and then back online. The act of taking disks offline and then online would effectively amount to a rebuild of the device stacks for the corresponding volumes hosted on such disks (i.e., "D:" volume and "E:" volume) similarly to what occurs during system reboot. However, the "C:" volume in Windows™ is the machine's boot volume and it hosts the system pagefile. Generally, the operating system will not allow the user to take offline a disk with a pagefile and thus the only way to rebuild the volume device stack for the system's boot volume may be to reboot the machine itself. Furthermore, the process of taking disks offline and then back online is similar to rebooting the machine from an application's perspective. Hence the use of such an upper filter driver usually requires downtime of a production server which could be hosting mission critical applications and workloads.

In various embodiments, in order to avoid having to reboot the system, various embodiments described herein apply a patch to a driver involved in creating snapshots of the volume 104. The patch replaces the original handlers of the driver with a set of alternate handlers that can begin tracking write operations and maintaining a bitmap of blocks that have changed since a particular point in time. This can all be done while the system is running and without interruption to the various operations performed on the volume.

Figure 2:
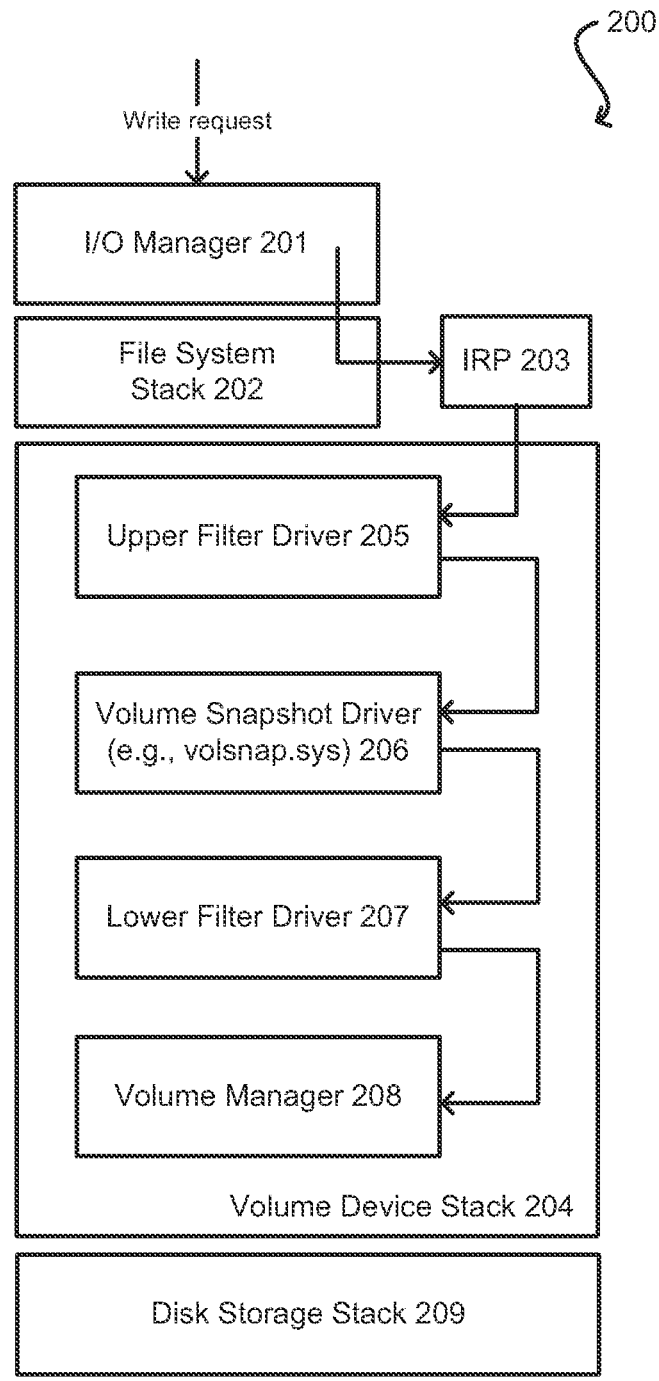
FIG. 2 illustrates an example of a write operation being processed by the various drivers of a volume device stack, in accordance with various embodiments.

FIG. 2 illustrates an example 200 of a write operation being processed by the various drivers of a volume device stack, in accordance with various embodiments. As shown in the illustration, when an I/O operation (e.g., write operation) is submitted to a volume, the I/O manager 201 and file system stack 202 intercepts the write request and converts the write request into an I/O Request Packet (IRP) 203. The IRP 203 represents what an application has requested from the operating system (i.e., the I/O that the application wants to execute against a particular file stored in disk storage 209). The I/O manager 201 then determines which stack the IRP 203 needs to be forwarded to. Once the I/O manager 201 determines the stack that the IRP 203 should be forwarded to, the I/O manager 201 forwards the IRP 203 to the topmost filter driver 205 in the volume stack 204. It is then the responsibility of each driver (205, 206, 207, 208) in the stack 204 to process the IRP 203 and then forward the IRP 203 to the next driver in the stack. Furthermore, some of the intermediate filter drivers may also be capable of canceling or completing the I/O operation on their own.

Figure 3:
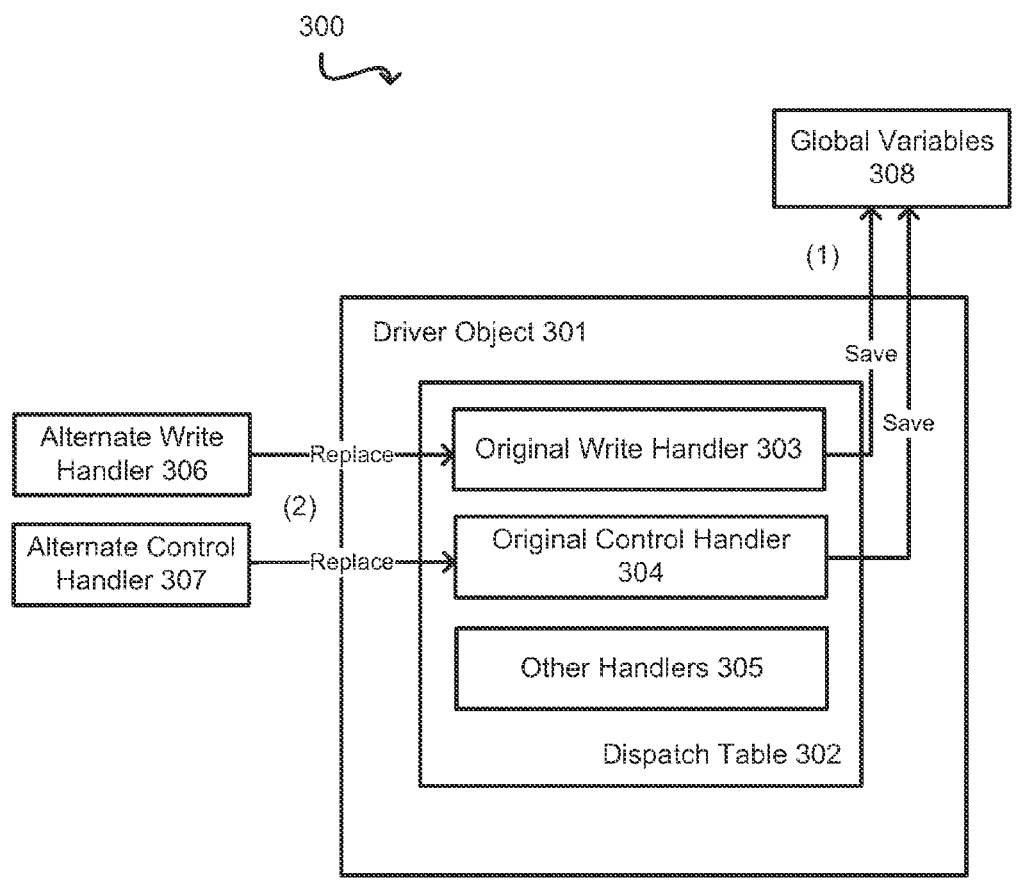
FIG. 3. Illustrates an example of applying a patch to a driver object in order to track write operations, in accordance with various embodiments.

FIG. 3. Illustrates an example 300 of applying a patch to a driver object in order to track write operations, in accordance with various embodiments. As shown in the illustration, in order to intercept the I/O operation, each filter driver, such as the volume snapshot driver, exposes a dispatch table 302. The dispatch table 302 has a number of entry points for various handlers, such as an original write handler 303, an original control handler 304 and other handlers 305.

In accordance with various embodiments described herein, in order to track write operations on a volume without rebooting the operating system, a patch may be applied to a particular driver 301. This driver 301 may be the filter driver responsible for creating volume snapshots (e.g., driver "volsnap.sys" in Windows™). The patch may be applied by invoking an application programming interface (API) to find the volume snapshot driver 301 by name and replacing the entry points in the dispatch table. In particular, the patch replaces the original write handler 303 of the driver 301 with an alternate write handler 306. In addition, the original control handler 304 of the volume snapshot driver 301 may be replaced with an alternate control handler 307. Any I/O flowing through the volume stack will then invoke one of these alternate handlers. The alternate handlers (306, 307) will be responsible for tracking write operations and other signals that will be used for incremental backups.

In one embodiment, the patch may be applied by a change block tracking (CBT) driver that is dynamically loaded into memory when installing the backup application. Once the CBT driver is loaded and before replacing the original write handler 303 of the driver 301, the system can save the original write handler 303 as a global variable 308. Similarly, the original control handler 304 may be saved as a global variable. Once replaced, the alternate write handler 306 tracks write operations flowing through the volume stack.

In one embodiment, to track each write operation, the alternate handler 306 records the offset on the volume and the length of the write operation. The length and the offset constitute the changed block and this changed block may be recorded in a bitmap. More specifically, in Windows™ based embodiments, once the patch has been applied, the CBT driver starts receiving write IRPs (e.g., "IRP_MJ_WRITE") and control IRPs (e.g., "IRP_MJ_DEVICE_CONTROL") for all registered volumes on the system via the patched write handler (e.g., "IRP_MJ_WRITE") and patched control handler "IRP_MJ_DEVICE_CONTROL"). Once the write operation (or other I/O) has been recorded, the alternate write handler 306 calls the original write handler that was saved under the global variables 308. Similarly, the alternate control handler 307 calls the original control handler saved in the global variables 308. This allows the system to function in the same manner as before applying the patch, with the added functionality of tracking write operations.

While the alternate patched handlers (306, 307) are executing, the CBT driver can maintain a global IRP entry count that is incremented/decremented on entry/exit, respectively, to the alternate write handler 306 and alternate control handler 307. When changed block tracking is no longer needed and/or needs to be stopped, the patch can be replaced with the original handlers (303, 304). Driver-unload routines and/or other control handlers (e.g., the "WT_UNPATCH IOCTL" handler) can restore the original saved handlers atomically and wait for the global IRP entry count to drop to zero before returning from the unload routine. This can ensure that the CBT driver is not unloaded from memory while the alternate handlers (306, 307) are executing.

In at least some embodiments, the driver that is selected to be patched with the alternate handlers is the volume snapshot service driver that is responsible for creating snapshots of volumes and for performing certain I/O operations on those snapshots. This driver may be selected in order to ensure that the CBT driver is in the path to writes as they flow down the volume device stack and at the same time ensures that flush and hold writes are received. Flush and hold writes are required for switching the incremental bitmap. In Windows™, the flush and hold writes (e.g., "IOCTL_VOL SNAP_FLUSH_AND_HOLD_WRITES") do not go beyond the volume snapshot driver (e.g., "volsnap.sys"). Furthermore, snapshots are named device objects and are directly created by the volume snapshot driver (e.g., "volsnap.sys"). By patching the write handler of this particular driver, it can be ensured that the write operations happening on the snapshot device would be monitored.

In various embodiments, once the dispatch table 302 of volume snapshot driver 301 is patched, the CBT driver starts receiving write and device control IRPs for all devices created by volume snapshot driver 301 (e.g., "volsnap.sys"). Snapshots created by the volume snapshot driver are named device objects. Their names may be prefixed with a character string, (e.g., "HardDiskShadowCopy"). After the patch has been applied, the driver marks each device object that it detects via either of its alternate write or control handlers (306, 307) in a simple linked list. Before adding a device object to the list, it queries the operating system if the corresponding device object has a name. In the volume device stack, the filter device objects created by volume snapshot driver are not named, while their counterparts in the snapshot device stack are named, as mentioned above. By invoking an API to query the name of the device object (e.g., "ObQueryNameString( )") against the target device object and then matching the output buffer for the signature character string (e.g., "HardDiskShadowCopy"), the driver is able to detect if the device object is for a snapshot device. Once detected, the driver marks it as a snapshot device and maintains a separate bitmap for tracking writes to it.

The processes for maintaining the bitmap will be described in further detail below, with reference to FIGS. 4, 5 and 7. In one embodiment, only those snapshots which are created under the context of the backup applications are marked for tracking write operations.

The various write operations tracked by the alternate write handler 303 may be the result of application writers attempting to alter the snapshot in order to make the snapshot data application consistent. The write operations may also include operations originating in the event of the backup application's writer deleting/excluding files from the snapshot. The ability to delete files from the snapshot will be described in further detail below, with reference to FIG. 5.

It should be noted that the various embodiments described throughout this disclosure may alternatively be implemented in a virtualized environment, where the operating system is installed on a virtual machine on the computing device rather than directly on the hardware of the device. As known in the art, virtual machines may be hosted by using a hypervisor or virtual machine manager (VMM) on the computing device and each virtual machine may include its own operating system, along with the kernel, drivers and other components. The tracking of write operations described throughout this disclosure can be utilized in the operating system installed in the virtual machine, as well as directly installed on the physical hardware on the computing device.

Figure 4:
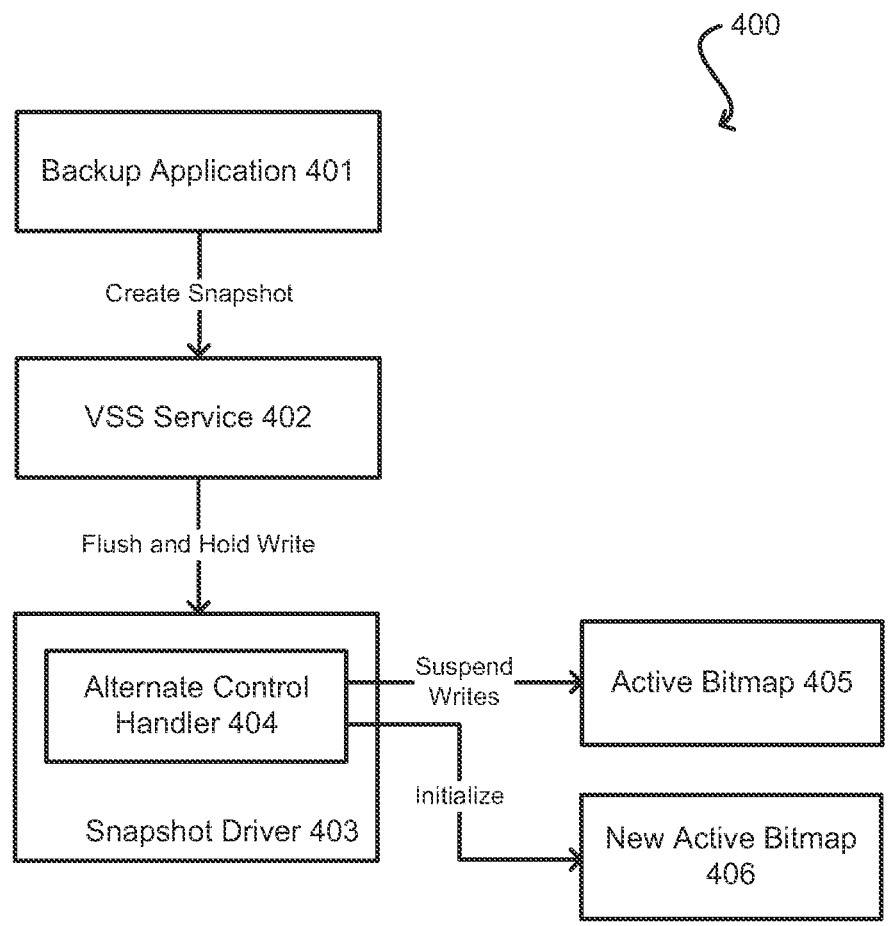
FIG. 4 illustrates an example of maintaining an active bitmap for a snapshot, in accordance with various embodiments.

FIG. 4 illustrates an example 400 of maintaining an active bitmap for a snapshot, in accordance with various embodiments. As previously mentioned, one the patch has been applied to the volume snapshot driver 403, the write operations and control signals start being tracked via the alternate handlers. More specifically, the alternate write handler is used to track write operations, while the alternate control handler is used to track control operations, such as flush and hold writes.

As shown in FIG. 4, to create a first backup, the backup application 401 initiates a create snapshot request to the VSS service 402. The VSS service 402 then issues a first flush and hold write control operation (e.g., "FLUSH_AND_HOLD_WRITE"). This control operation is detected via the alternate control handler 404 of the volume snapshot driver 403. Once the control code is detected, an active bitmap is initialized. The flush and hold write control code signifies a point in time where I/O operations on the volume are suspended. Once the first flush and hold write control operation is detected and the active bitmap is initialized, the write handler starts tracking writes. From that point on, the system is maintaining the active bitmap 405 which is tracking writes that are occurring since the last flush and hold write control signal. Also, as a result of the first flush and hold write, there has been a resulting snapshot captured of the volume.

The active bitmap 405 will continue to record the changed blocks caused by the write operations occurring on the volume until the next control signal is received to the volume snapshot driver 403. The next control signal will be issued upon the next time that the incremental backup needs to be performed. For example, if the next incremental backup will be performed in two days, then for the time interval of two days, the alternate write handler will continuously track write operations performed on the volume. At the end of that time interval, the backup application 401 once again initiates a VSS snapshot request. This request once again initiates a flush and hold write control signal that is transmitted down the volume device stack. Once this control signal is detected by the alternate control handler 404, the control handler can perform two actions. Specifically, upon receiving the next control signal and determining that there is an active bitmap 405 that already exists, the control handler: (1) suspends tracking writes on the active bitmap 405 (i.e., the bitmap that was initialized in the first control signal); and (2) initializes a new active bitmap 406 and marks it as the currently active bitmap.

Thus, any writes occurring after the second flush and hold write control signal would go into the new active bitmap 406. The bitmap 405, which is no longer active after the control operation, represents the changes that have happened since the snapshot was created with the control operation (e.g., changes that have occurred over the last two days in the above example). Thus, bitmap 405 represents all the changes/writes that have been made from the first control code to the second control code that caused the bitmap to be stopped. This bitmap 405 can then be used to perform the incremental backup.

Figure 5:
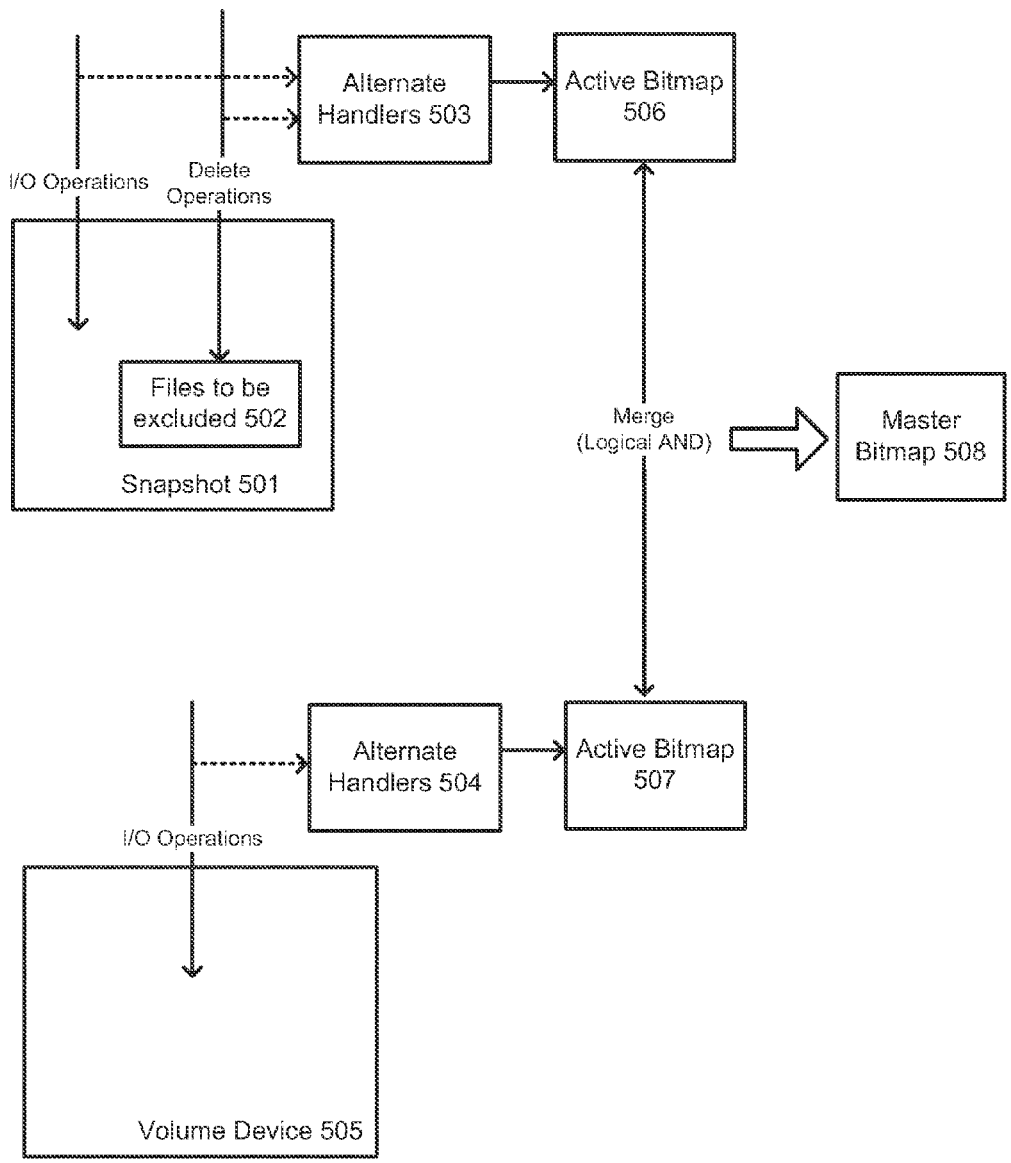
FIG. 5 illustrates an example of merging multiple active bitmaps to create a master bitmap, in accordance with various embodiments.

FIG. 5 illustrates an example 500 of merging multiple active bitmaps to create a master bitmap, in accordance with various embodiments. As shown in the illustration, there are two volumes created by the system, the actual volume device 505 and the snapshot 501 volume. The write operations are tracked for both the actual volume 505 and the snapshot 501 by using alternate handlers 504 and 503 respectively. In addition, a separate active bitmap is maintained for each volume. That is, the actual volume 505 has a corresponding active bitmap 507 for recording changed blocks and the snapshot 501 has a corresponding active bitmap 506 for recording changed blocks.

At the time of providing the snapshot to the application, the VSS may perform some write operations to the snapshot volume 501 in order to ensure that the snapshot volume 501 is consistent with the physical volume 505. In some embodiments, it is important that these write operations are captured in the bitmaps. Thus, as shown in the illustrated embodiment, the active bitmap 506 and the active bitmap 507 are merged to get a master bitmap 508 which would be the correct and up-to-date bitmap. The bitmaps can be merged by performing a logical AND of the two bitmaps 506 and 507 to produce the master bitmap 508. This master bitmap 508 is used by the backup application to maintain consistent backup.

In some embodiments, the master bitmap 508 may also be used to allow the user application to specify an exclude list of files 502 that should not be included in the backup. In many cases, not all files included in the snapshot of the volume need to be backed up and the backup application may specify the files that should be excluded. For example, the application may specify that the backup should not include a file "pagefile.sys". In this example, the application would take the first fill snapshot and then during small window of time when the snapshot is capable of being written to, the backup application executes a delete on "pagefile.sys" (or other specified exclude file) which resides in the snapshot volume 501. This window of time is used to allow both the operating system and the application to make the snapshot 501 consistent with the volume device 501. This time window can be taken advantage of in order to issue the delete operations to delete the file 502 from the snapshot 501. It should be noted that the file 502 should not be excluded from the volume device 505 but only from the snapshot 501.

In various embodiments, the delete operation (i.e. I/O operation) is also tracked by using the alternate handlers 503. Furthermore, as a result of merging the active bitmaps (506, 507), the I/O delete operation becomes part of the merged master bitmap 508 and therefore the causes the backup copy to exclude the specified files 502.

Figure 6:
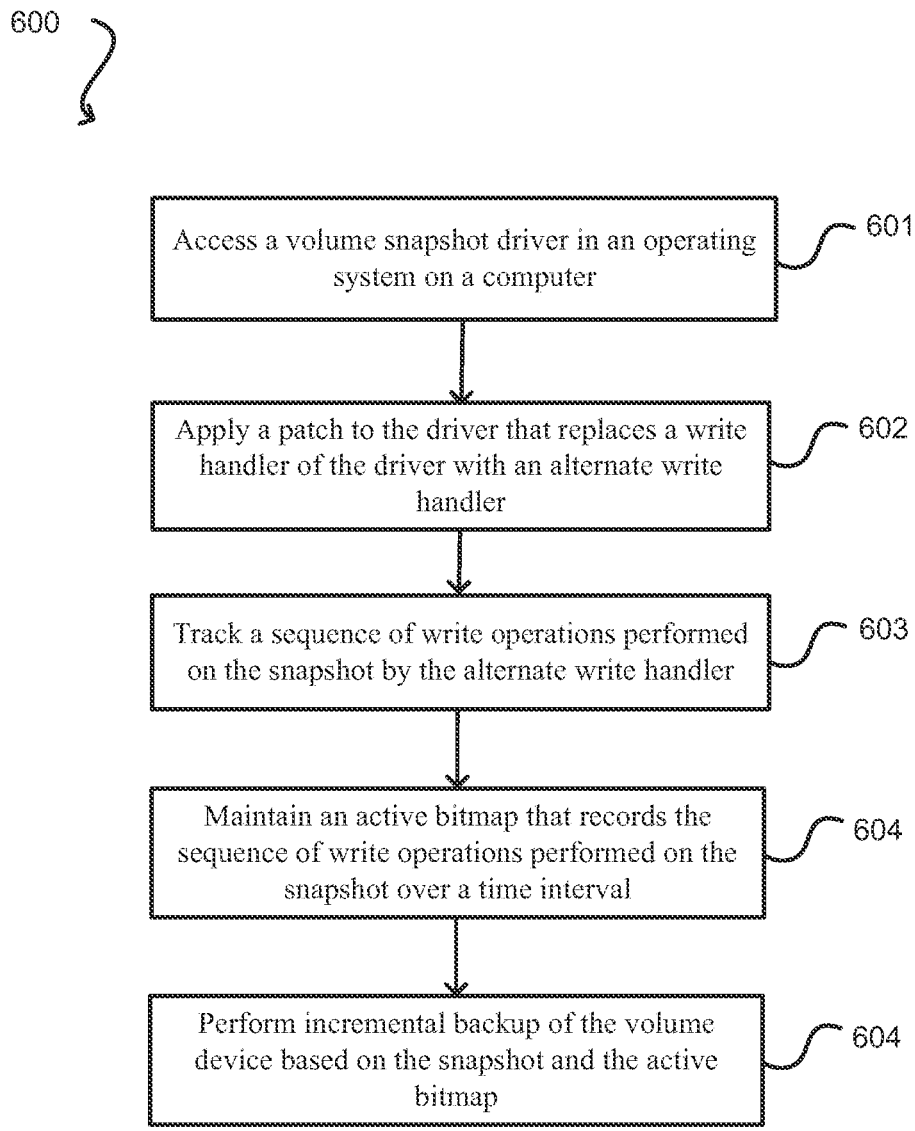
FIG. 6 illustrates an example of a process for patching the volume snapshot driver to track write operations, in accordance with various embodiments.

FIG. 6 illustrates an example 600 of a process for patching the volume snapshot driver to track write operations, in accordance with various embodiments. Although this figure as well as other process flows contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 601, a filter driver associated with a snapshot of a volume is accessed on an operating system. The fitter driver can be a volume snapshot driver that is operable to create a snapshot of a volume on the computer and to perform input and output (I/O) operations on the snapshot. The accessing may be performed via an application programming interface (API) provided by the operating system. Specifically a change block tracking (CBT) driver of the backup application may be dynamically loaded into memory, and this CBT driver may invoke the API operation to access the volume snapshot driver.

In operation 602, a patch is applied to the volume snapshot driver. The patch is configured to replace the original write handler of the volume snapshot driver with an alternate write handler. In addition, the patch may be configured to replace the original control handler with an alternate control handler. The use of the alternate write handler enables the tracking write operations performed on the snapshot, as illustrated in operation 603.

In operation 604, the CBT driver maintains an active bitmap that records the sequence of write operations performed on the snapshot over a time interval. For example, the active bitmap may store the changed blocks (i.e., the offset and length of each write operation performed on the snapshot). In operation 605, an incremental backup of the volume is performed by the backup application based on the snapshot and based on the active bitmap that records the sequence of write operations performed over the time interval.

Figure 7:
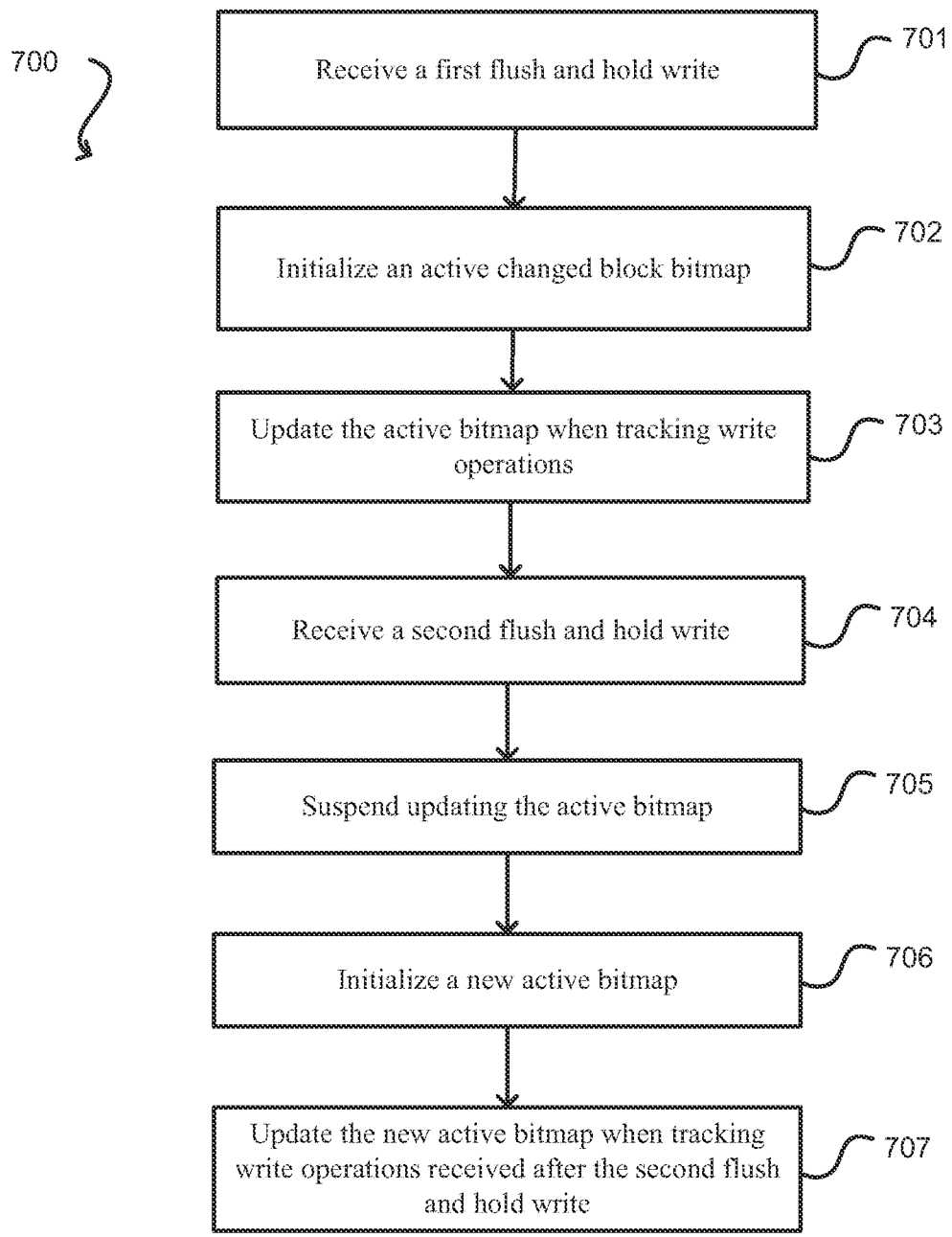
FIG. 7 illustrates an example of a process for maintaining an active bitmap to record changed blocks as a result of write operations in the snapshot, in accordance with various embodiments.

FIG. 7 illustrates an example 700 of a process for maintaining an active bitmap to record changed blocks as a result of write operations in the snapshot, in accordance with various embodiments. In operation 701, the volume snapshot driver receives a first flush and hold write control signal. The control signal may be received as a result of a request to a create snapshot request submitted from the backup application to the VSS service. This control signal is detected via the alternate control handler of the volume snapshot driver.

In operation 701, in response to detecting the control signal, a first active changed block bitmap is initialized. The flush and hold write control code signifies a point in time where I/O operations on the volume are suspended. Once the active changed block bitmap is initialized, the write handler starts tracking write operations on the snapshot. The changed blocks caused by the write operations are recorded by updating the active bitmap, as shown in operation 703.

The active bitmap will continue to record the write operations occurring on the volume until the next control signal is received to the volume snapshot driver. In operation 704, the next flush and hold write control signal is received to the volume snapshot driver. This next control signal was issued as a result of the backup application initializing the next incremental backup.

Upon receiving the next control signal and determining that there is an active bitmap that already exists, the updating of the active bitmap is suspended, as shown in operation 705. Thus, the alternate write handler no longer updates the active bitmap and the active bitmap is "frozen." In addition, a new active bitmap is initialized (operation 706) for recording the write operations that occur subsequent to the control signal. This new bitmap is marked as the currently active bitmap. In operation 707, the new active bitmap is updated when tracking write operations received after the second flush and hold write control signal.

Figure 8:
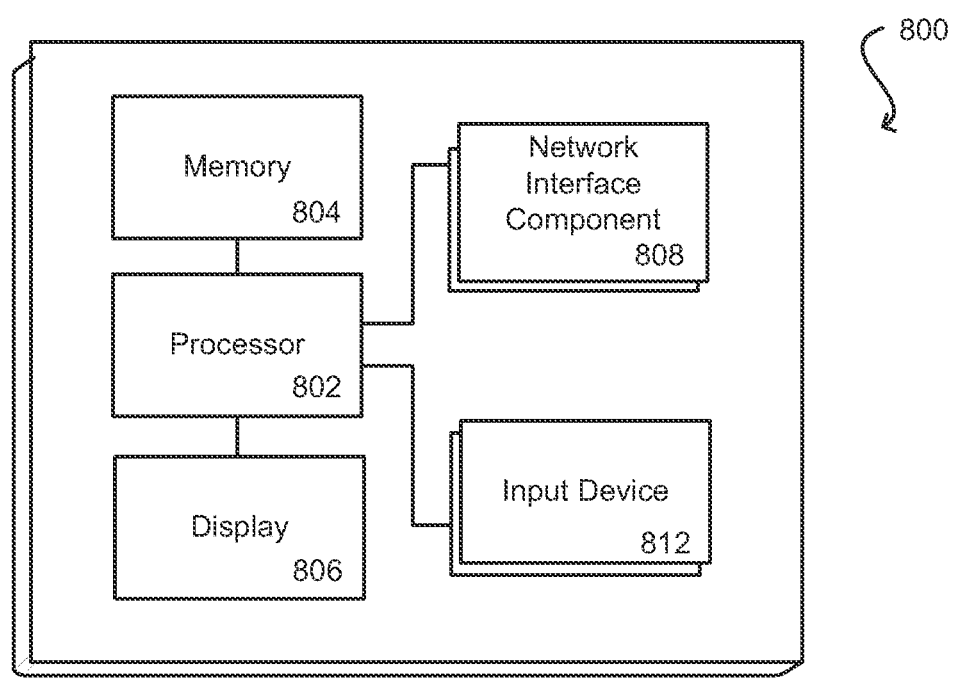
FIG. 8 illustrates a logical arrangement of a set of general components of an example computing device that can be utilized in accordance with various embodiments.

FIG. 8 illustrates a logical arrangement of a set of general components of an example computing device 800. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one input element 808 able to receive conventional input from a user. This conventional input can include, for example, a push button, touch pad, touch screen, keyboard, mouse, keypad, or any other such device or element whereby a user can input a command to the device. In some embodiments, the computing device 800 of FIG. 8 can include one or more network interface elements 808 for communicating over various networks, such as a Wi-Fi, Bluetooth, RIP, wired, or wireless communication systems. The device in many embodiments can communicate with a network, such as the Internet, and may be able to communicate with other such devices.

Each computing device typically will include an operating system that provides executable program instructions for the general administration and operation of that device and typically will include computer-readable medium storing instructions that, when executed by a processor of the server, allow the computing device to perform its intended functions. Suitable implementations for the operating system and general functionality of the servers are known or commercially available and are readily implemented by persons having ordinary skill in the art, particularly in light of the disclosure herein.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments where the computing device includes a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for tracking write operations to perform incremental backups, the method comprising:

accessing a driver of an operating system on a computer, the driver creating a snapshot volume of a physical volume of the computer;

applying a patch to the driver, the patch configured to replace an original write handler of the driver with a first alternate write handler, the first alternate write handler tracking a sequence of write operations performed on the snapshot volume, the tracking of the sequence of write operations performed on the snapshot volume being caused by invoking the first alternate write handler, and the tracking of the sequence of write operations performed on the snapshot volume maintaining a first active bitmap recording the sequence of write operations performed on the snapshot volume over a time interval;

accessing a second alternate write handler when an input-output manager of the operating system writes to the physical volume, the second alternate write handler tracking a sequence of write operations performed on the physical volume, the tracking of the sequence of write operations performed on the physical volume being caused by invoking the second alternate write handler, and the tracking of the sequence of write operations performed on the physical volume maintaining a second active bitmap recording the sequence of write operations performed on the physical volume over the time interval;

determining one or more files to be excluded from the incremental backup;

executing a delete operation on the snapshot volume to remove the one or more files from the snapshot, wherein the delete operation is handled by the first alternate write handler;

merging the first active bitmap with the second active bitmap to produce a master bitmap, so that the delete operation is reflected in the master bitmap; and performing an incremental backup of the physical volume based on the snapshot volume and based on the master bitmap to maintain consistent backup during continued execution of the operating system and without disruption to the write operations on the physical volume, wherein the one or more files are excluded from the incremental backup when the incremental backup is preformed based on the snapshot volume and based on the master bitmap.

2. The computer implemented method of claim 1, wherein accessing the driver of the operating system further comprises:

invoking an application programming interface (API) exposed by the operating system to directly reference a driver of the volume shadow copy service (VSS) provided by the operating system.

3. The computer implemented method of claim 1, which further includes computing a logical AND of the first active bitmap with the second active bitmap in order to merge the first active bitmap with the second active bitmap to produce the master bitmap.

4. A computing system, comprising:

at least one processor; and memory including instructions that, when executed by the at least one processor, cause the computing system to:

access a driver of an operating system on a computer, the driver creating a snapshot volume of a physical volume of the computer;

apply a patch to the driver, the patch configured to replace an original write handler of the driver with a first alternate write handler, the first alternate write handler tracking a sequence of write operations performed on the snapshot volume, the tracking of the sequence of write operations performed on the snapshot volume being caused by invoking the first alternate write handler, and the tracking of the sequence of write operations performed on the snapshot volume maintaining a first active bitmap recording the sequence of write operations performed on the snapshot volume over a time interval;

access a second alternate write handler when an input-output manager of the operating system writes to the physical volume, the second alternate write handler tracking a sequence of write operations performed on the physical volume, the tracking of the sequence of write operations performed on the physical volume being caused by invoking the second alternate write handler, and the tracking of the sequence of write operations performed on the physical volume maintaining a second active bitmap recording the sequence of write operations performed on the physical volume over the time interval;

determine one or more files to be excluded from the incremental backup;

execute a delete operation on the snapshot volume to remove the one or more files from the snapshot, wherein the delete operation is handled by the first alternate write handler;

merge the first active bitmap with the second active bitmap to produce a master bitmap, so that the delete operation is reflected in the master bitmap; and perform an incremental backup of the physical volume based on the snapshot volume and based on the master bitmap to maintain consistent backup during continued execution of the operating system and without disruption to the write operations on the physical volume, wherein the one or more files are excluded from the incremental backup when the incremental backup is preformed based on the snapshot volume and based on the master bitmap.

5. The computing system of claim 4, wherein the memory further includes instructions executed by the at least one processor to cause the computing system to:

invoke an application programming interface (API) exposed by the operating system to directly reference a driver of the volume shadow copy service (VSS) provided by the operating system.

6. The computing system of claim 4, wherein the memory further includes instructions executed by the at least one processor to cause the computing system to compute a logical AND of the first active bitmap with the second active bitmap in order to merge the first active bitmap with the second active bitmap to produce the master bitmap.

7. A non-transitory computer readable storage medium storing one or more sequences of instructions that, when executed by one or more processors, cause the one or more processors to:

access a driver of an operating system on a computer, the driver creating a snapshot volume of a physical volume of the computer;

apply a patch to the driver, the patch configured to replace an original write handler of the driver with a first alternate write handler, the first alternate write handler tracking a sequence of write operations performed on the snapshot volume, the tracking of the sequence of write operations performed on the snapshot volume being caused by invoking the first alternate write handler, and the tracking of the sequence of write operations performed on the snapshot volume maintaining a first active bitmap recording the sequence of write operations performed on the snapshot volume over a time interval;

access a second alternate write handler when an input-output manager of the operating system writes to the physical volume, the second alternate write handler tracking a sequence of write operations performed on the physical volume, the tracking of the sequence of write operations performed on the physical volume being caused by invoking the second alternate write handler, and the tracking of the sequence of write operations performed on the physical volume maintaining a second active bitmap recording the sequence of write operations performed on the physical volume over the time interval;

determine one or more files to be excluded from the incremental backup;

execute a delete operation on the snapshot volume to remove the one or more files from the snapshot, wherein the delete operation is handled by the first alternate write handler;

merge the first active bitmap with the second active bitmap to produce a master bitmap, so that the delete operation is reflected in the master bitmap; and perform an incremental backup of the physical volume based on the snapshot volume and based on the master bitmap to maintain consistent backup during continued execution of the operating system and without disruption to the write operations on the physical volume, wherein the one or more files are excluded from the incremental backup when the incremental backup is preformed based on the snapshot volume and based on the master bitmap.

8. The non-transitory computer readable storage medium of claim 7, further comprising instructions that, when executed by the one or more processors, cause the one or more processors to access the driver of the operating system by invoking an application programming interface (API) exposed by the operating system to directly reference a driver of the volume shadow copy service (VSS) provided by the operating system.

9. The non-transitory computer readable storage medium of claim 7, further comprising instructions that, when executed by the one or more processors, cause the one or more processors to compute a logical AND of the first active bitmap with the second active bitmap in order to merge the first active bitmap with the second active bitmap to produce the master bitmap.

* * * * *